United States Patent
Chen

(10) Patent No.: US 9,924,211 B2
(45) Date of Patent: Mar. 20, 2018

(54) TRANSPORT STREAM PROCESSOR CAPABLE OF TIMING CALIBRATION, AND TIMING CALIBRATION DEVICE AND METHOD

(71) Applicant: MStar Semiconductor, Inc., Hsinchu Hsien (TW)

(72) Inventor: Yao-Dong Chen, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/213,550

(22) Filed: Jul. 19, 2016

(65) Prior Publication Data

US 2017/0034553 A1 Feb. 2, 2017

(30) Foreign Application Priority Data

Jul. 31, 2015 (TW) .............................. 104124881 A

(51) Int. Cl.
*H04N 21/242* (2011.01)
*H04N 21/236* (2011.01)
*H04N 21/43* (2011.01)
*H04L 29/06* (2006.01)

(52) U.S. Cl.
CPC ......... *H04N 21/242* (2013.01); *H04L 65/608* (2013.01); *H04N 21/236* (2013.01); *H04N 21/4305* (2013.01)

(58) Field of Classification Search
CPC . H03L 7/00; H03L 7/081; H03L 7/091; H04L 7/0033; H04L 7/0041; H04L 7/0045; H04L 7/0278; H04L 7/033; H04L 7/0334; H04L 65/608; H04N 21/218; H04N 21/233; H04N 21/234; H04N 21/236; H04N 21/23602; H04N 21/23608; H04N 21/2368; H04N 21/238; H04N 21/242
USPC .............. 375/240.26, 240.28, 326, 328, 355, 375/360–362, 371, 373; 327/231, 327/233–236, 261, 263, 269; 348/512, 348/513, 526, 536–538, 541; 713/400, 713/401, 502, 503, 600
See application file for complete search history.

(56) References Cited

U.S. PATENT DOCUMENTS

2009/0039927 A1* 2/2009 Gillingham ......... G06F 13/1694
327/156
2010/0020179 A1* 1/2010 Horan .................... G09G 5/006
348/181
2010/0309791 A1* 12/2010 Fuller ....................... H04L 1/20
370/242

(Continued)

*Primary Examiner* — Young T Tse
(74) *Attorney, Agent, or Firm* — Edell, Shapiro & Finnan, LLC

(57) ABSTRACT

A timing calibration device for calibrating a timing relationship between a clock signal and a first signal includes: an input port, receiving the clock signal through a clock transmission path, and receiving the first signal through a first path; and a calibrator. The calibrator includes: a first sampling circuit, sampling the first signal according to the clock signal to generate a first sample result; a control circuit, determining that the first sample result is valid when the first sampling result includes a transition edge of the first signal; and a first edge adjusting circuit, adjusting one of a transition edge of the clock signal and the transition edge of the first signal when the first sample result is valid to satisfy a predetermined timing relationship.

15 Claims, 9 Drawing Sheets

(56) References Cited

U.S. PATENT DOCUMENTS

| | | | | |
|---|---|---|---|---|
| 2013/0300478 A1* | 11/2013 | Hsieh | ............ | H03L 7/00 327/161 |
| 2014/0334243 A1* | 11/2014 | Duffner | ............ | G11C 7/00 365/233.13 |
| 2014/0347099 A1* | 11/2014 | Ma | ............ | G11C 7/222 326/94 |

* cited by examiner

US 9,924,211 B2

TRANSPORT STREAM PROCESSOR CAPABLE OF TIMING CALIBRATION, AND TIMING CALIBRATION DEVICE AND METHOD

This application claims the benefit of Taiwan application Serial No. 104124881, filed Jul. 31, 2015, the subject matter of which is incorporated herein by reference.

BACKGROUND OF THE INVENTION

Field of the Invention

The invention relates in general to a transport stream processor and a timing calibration device and method, and more particularly to a transport stream processor and a timing calibration device and method capable of calibrating the timing of a transport stream.

Description of the Related Art

In general, when a signal processor receives a signal, the signal is sampled according to an appropriate clock in order to restore contents of the signal. For example, when processing a transport stream (TS) of Digital Video Broadcasting (DVB), a transport stream processor samples a plurality of sets of data signals in the transport stream according to a clock signal in the transport stream to restore the contents of the transport stream. However, as the transmission path of the clock signal differs from the transmission paths of the data signals, the clock signal and the data signals received by the transport stream processor may be asynchronous in a way that the transport stream processor fails to correct sample the data signals, hence resulting in incorrect restored contents.

SUMMARY OF THE INVENTION

The invention is directed to a transport stream processor and a timing calibration device and method for improving the prior art.

The present invention discloses a transport stream processor capable of timing calibration. The transport stream processor is for processing a transport stream, which includes a clock signal and a plurality of data signals. The transport stream processor includes an input port, a calibrator and a processing unit. The input port receives the clock signal and the data signals through a plurality of paths. The calibrator includes: a plurality of sampling circuit, respectively sampling the data signals according to the clock signal to generate a plurality of sample results; a control circuit, determining the validity of the sampled results according to whether each of the sample results includes a transition edge of the corresponding data signal; and a plurality of edge adjusting circuits, respectively adjusting the transition edges of the data signals when the sample results are valid, such that the adjusted transition edges of the data signals and a transition edge of the clock signal satisfy a predetermined timing relationship. The processing unit identifies a header of packet data from the adjusted data signals, and determines to output the packet data through one of an audio output path, a video output path and a data output path according to the header.

The present invention further discloses a timing calibration device. The timing calibration device is applied to the foregoing transport stream processor to calibrate a timing relationship between a clock signal and a first signal of a transport stream. According to an embodiment, the timing calibration device includes: an input port, receiving the clock signal through a clock transmission path, and receiving the first signal through a first path; and a calibrator. The calibrator includes: a first sampling circuit, sampling the first signal according to the clock signal to generate a first sample result; a control circuit, determining that the first sample result is valid when the first sample result includes a transition edge of the first signal; and a first edge adjusting circuit, adjusting one of a transition edge of the clock signal and the transition edge of the first signal when the first sample signal is valid.

The present invention correspondingly discloses a timing calibration method for calibrating a timing relationship between a clock signal and a first signal of a transport stream. According to an embodiment, the timing calibration method includes: receiving the clock signal through a clock transmission path, and receiving the first signal through a first transmission path; and a calibration step, calibrating a relationship between the clock signal and the first signal. The calibration step includes: sampling the first signal according to the clock signal to generate a first sample result; determining that the first sample result is valid when the first sample result includes a transition edge of the first signal; and adjusting one of a transition edge of the clock signal and the transition edge of the first signal to satisfy a predetermined timing relationship when the first sample result is valid.

The above and other aspects of the invention will become better understood with regard to the following detailed description of the preferred but non-limiting embodiments. The following description is made with reference to the accompanying drawings.

DETAILED DESCRIPTION OF THE INVENTION

The present invention discloses a timing calibration device, a transport stream processor and a timing calibration method capable of calibrating a relationship between a clock signal and a data signal transmitted through different paths.

Figure 1:
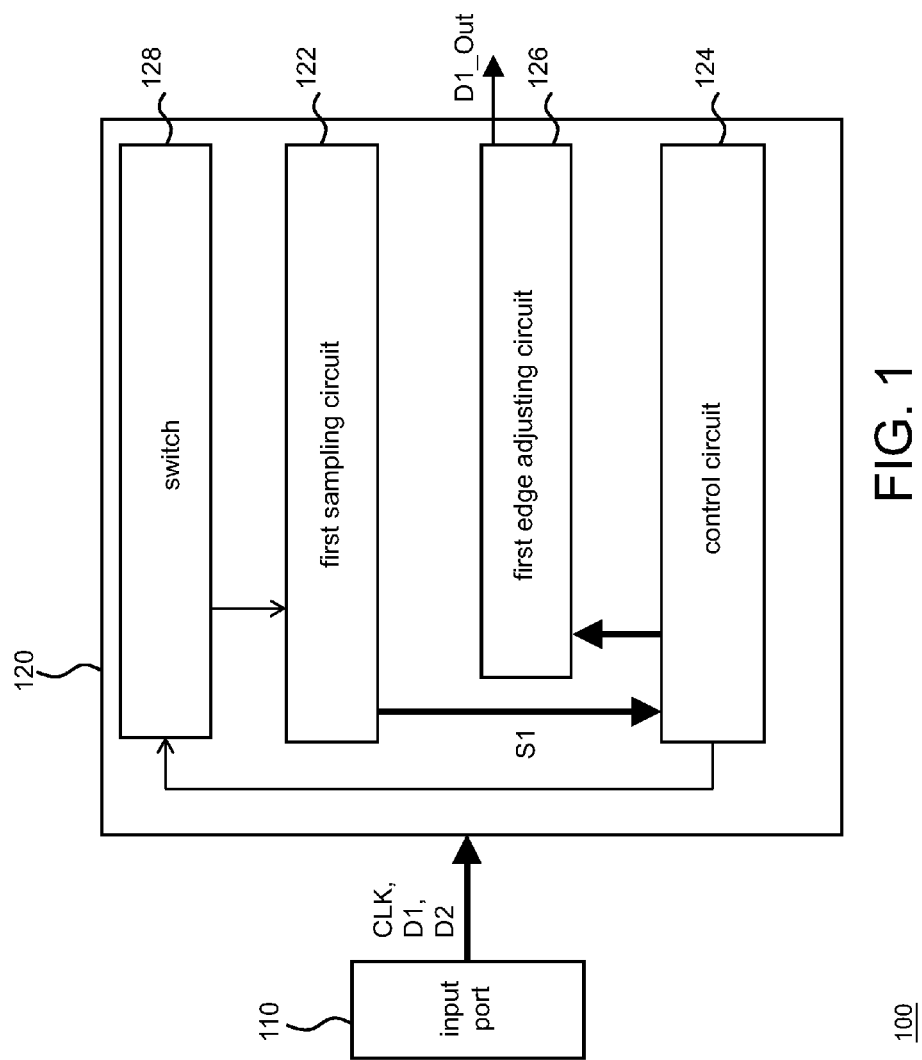
FIG. 1 is a schematic diagram of a timing calibration device according to an embodiment of the present invention.

FIG. 1 shows a schematic diagram of a timing calibration device according to an embodiment of the present invention. As shown in FIG. 1, a timing calibration device 100 includes an input port 110 and a calibrator 120. For example, the input port 110 is a plurality of pins, and receives a transport stream (TS) through a plurality of paths. For example, the transport stream is a Digital Video Broadcasting (DVB) transport stream, or other MPEG-2-compliant transport streams, and includes a clock signal CLK and a plurality of sets of data signals. The data signals include a first signal D1 and a second signal D2. The input port 110 receives the clock signal CLK through a clock transmission path, receives the first signal D1 through a first path, and receives the second signal D2 through a second path. The calibrator 120 calibrates the relationship between the clock signal CLK and the first signal D1, and outputs a calibrated signal (e.g., a calibrated first signal D1_out) for actual sampling or subsequent adjustment (e.g., phase adjustment). The calibrated signal may be selectively used to calibrate the relationship between the clock signal and other data signals (e.g., the second signal D2). The calibrator 120 includes a first sampling circuit 122, a control circuit 124 and a first edge adjusting circuit 126.

Figure 2:
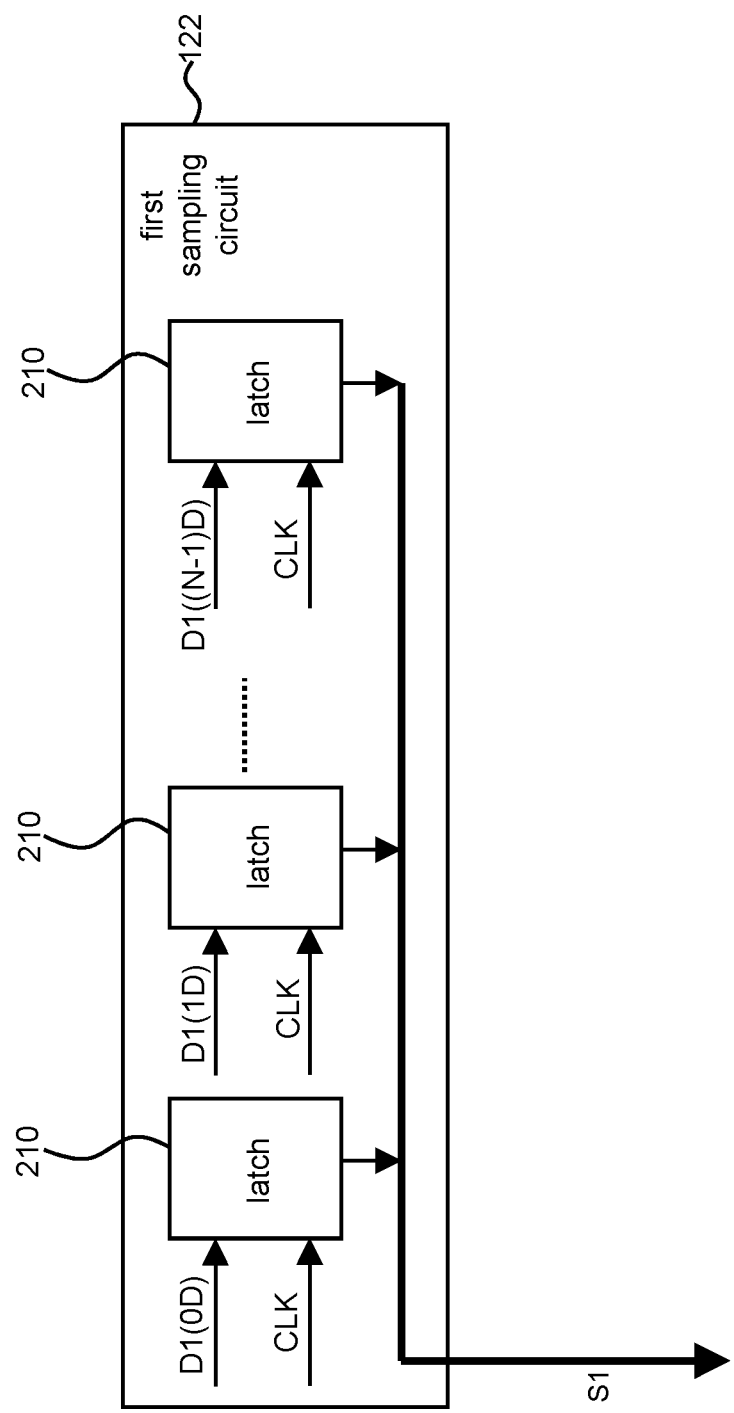
FIG. 2 is a schematic diagram of a first sampling circuit in FIG. 1 according to an embodiment.

As previously described, the first sampling circuit 122 samples the first signal D1 according to the clock signal CLK to generate a first sample result S1 for the control circuit 124 for further analysis. As shown in FIG. 2, the first sampling circuit 122 according to an embodiment includes N latches 210, which respectively sample a non-delayed first signal D1(0D), a first signal D1 (1D) delayed by one unit, . . . and a first signal D1((N−1)D) delayed by (N−1) units in a signal transmission order according to the clock signal CLK to accordingly generate a first sample result S1 that includes N sets of parallel outputted sampled data, where N is an integer greater than 1 and may be determined by a practitioner based on actual requirements. The delayed signals D1 (0D) to D1((N−1)D) may be generated by a known delay circuit or a particularly designed delay circuit. For example, the control circuit 124 is a processor or a circuit capable of logic determination required by the embodiment, and determines that the first sample result S1 is valid when the first sample result S1 includes a transition edge (i.e., a level change edge from 0 to 1 or from 1 to 0) of the first signal D1. For example, the first sample signal S1 is a 10-bit sample value 0000111111 or 1111000000. When the first sample result S1 is invalid (e.g., an invalid sample result S1 is a result where all sample values are 1 or all sample values are 0), the control circuit 124 causes the first sample circuit 122 to again sample the first signal D1 to generate a new first sample result S1, until the first sample result S1 is valid. The first edge adjusting circuit 126 adjusts one of the transition edge of the clock signal CLK and the transition edge of the first signal D1 when the first sample result S1 is valid to satisfy a predetermined timing relationship.

Figure 3:
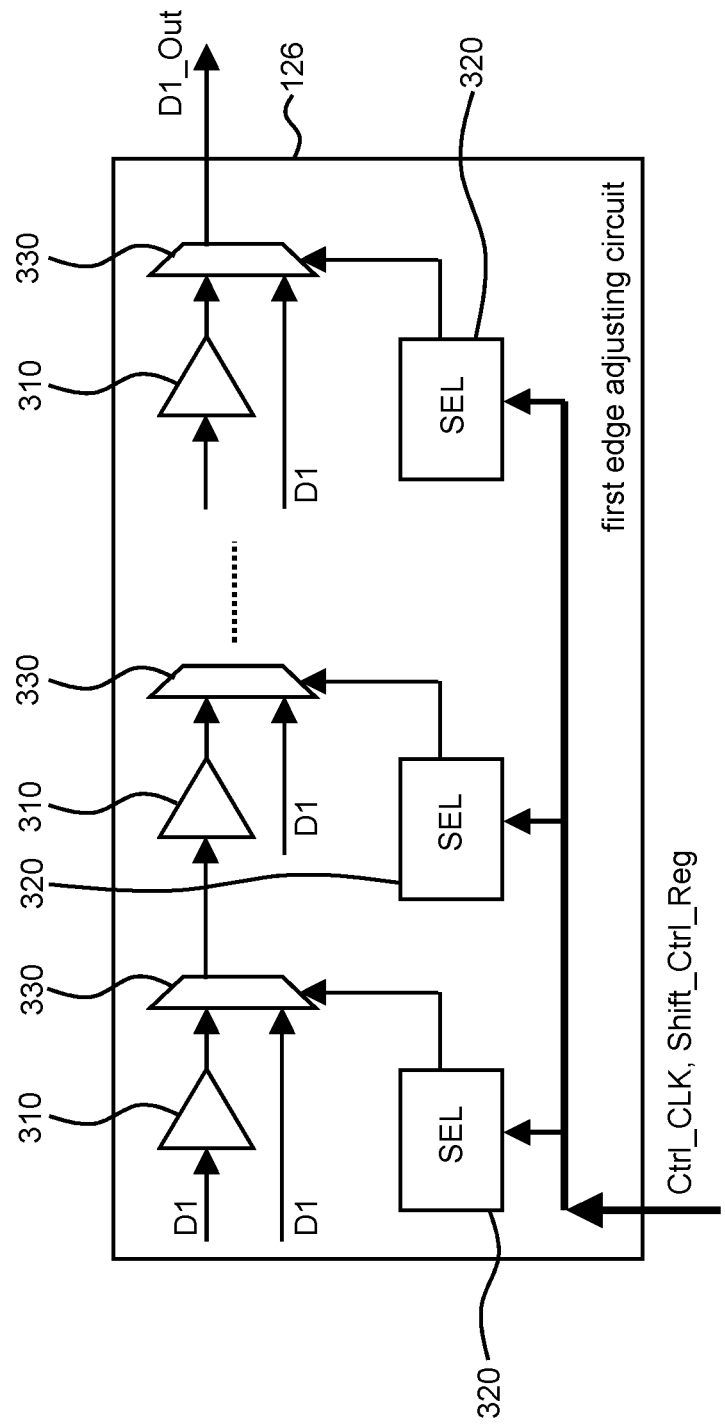
FIG. 3 is a schematic diagram of a first edge adjusting circuit in FIG. 1 according to an embodiment.

As shown in FIG. 3, the first edge adjusting circuit 126 according to an embodiment includes M delay units 310, M selection control units 320 (denoted as SEL), and M multiplexers 330. Each delay unit 310 delays by one unit, and outputs the first signal D1 delayed by one or multiple units according to the input signal. According to a trigger signal Ctrl_CLK (with a frequency equivalent to the frequency of the clock signal CLK) of the control circuit 120 and M edge adjusting signals Shift_Ctrl_Reg, the M selection units 320 causes each of the M multiplexers 330 to output the first signal D1 that is non-delayed or delayed by one or multiple units, where M is an integer greater than 1 (e.g., the value of M is equal to the value of N). For example, when M is 3 and three edge adjusting signals Shift_Ctrl_Reg are 011, the first multiplexer 330 receiving 0 outputs the first signal D1 that is non-delayed, the second multiplexer 330 receiving 1 outputs the first signal D1 that is delayed by one unit, and the third multiplexer 330 receiving 1 outputs the first signal D1 that is delayed by two units as a final outputted first signal D1_Out for actual sampling or other adjustment processes (e.g., phase adjustment). In one embodiment, the delay units 310 may also generate delayed signals D1(0D) to D1((N−1)D).

Figure 4:
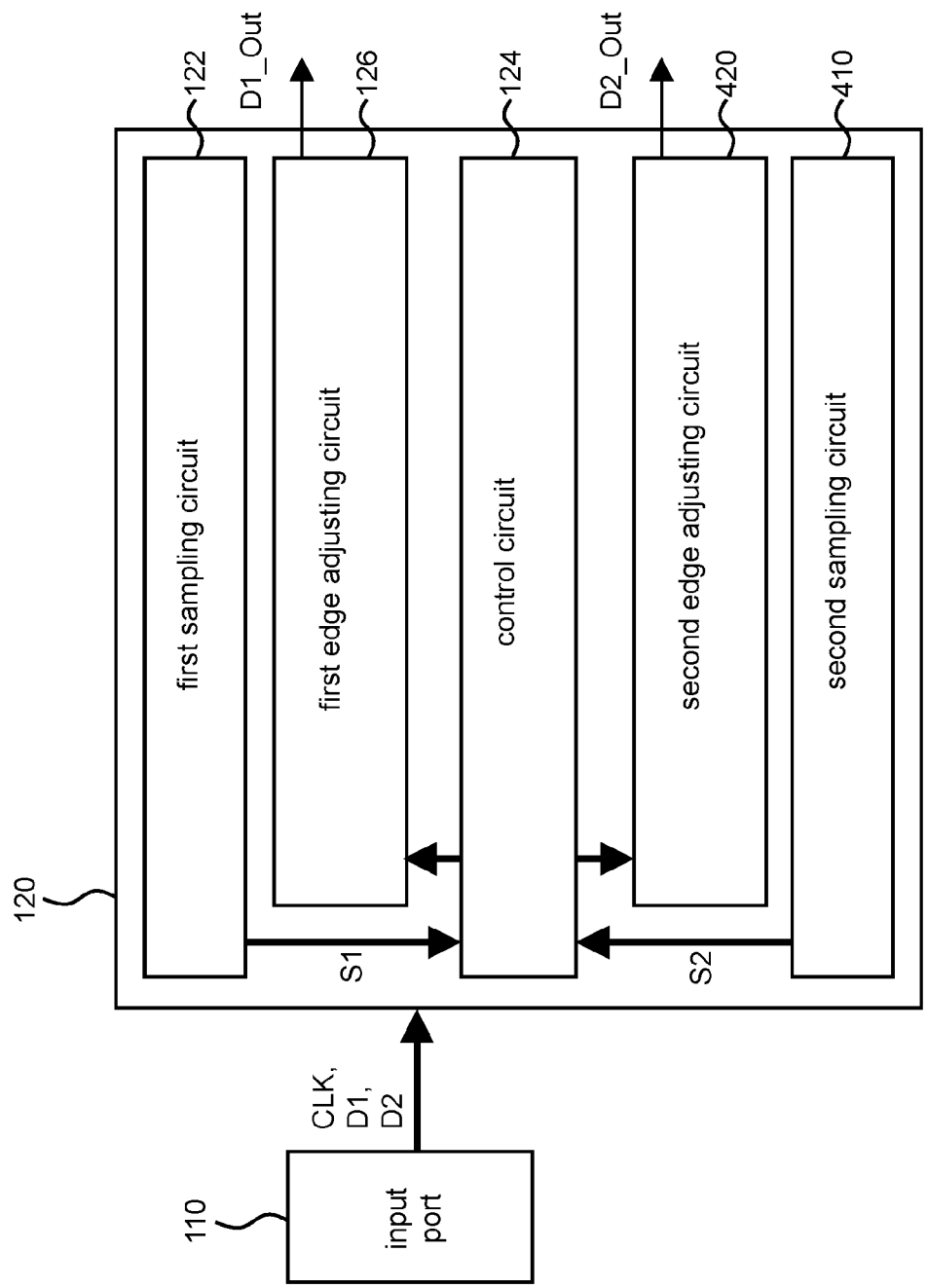
FIG. 4 is a schematic diagram of a calibrator in FIG. 1 according to another embodiment.

If the calibrator 120 is also used to calibrate the relationship between the clock signal CLK and the second signal D2, as shown in FIG. 4, the calibrator 120 further includes: a second sampling circuit 410, sampling the second signal D2 according to the clock signal CLK to generate a second sample result S2, a control circuit 124, determining that the second sample result S2 is valid when the second sample result S2 includes a transition edge of the second signal D2, and a second edge adjusting circuit 420, adjusting one of the transition edge of the clock signal CLK and the transition edge of the second signal D2 when the second sample signal S2 is valid to satisfy the predetermined timing relationship, and outputting a calibrated signal (e.g., a calibrated second signal D2_Out) for actual sampling or subsequent adjustment (e.g., phase adjustment). As the second sampling circuit 410 and the second edge adjusting circuit 420 are respectively similar or equivalent to the first sampling circuit 122 and the first edge adjusting circuit 126, the repeated details are omitted herein. Details of adjusting the relationship between the clock signal CLK and other data signals can be accordingly deduced.

Figure 5:
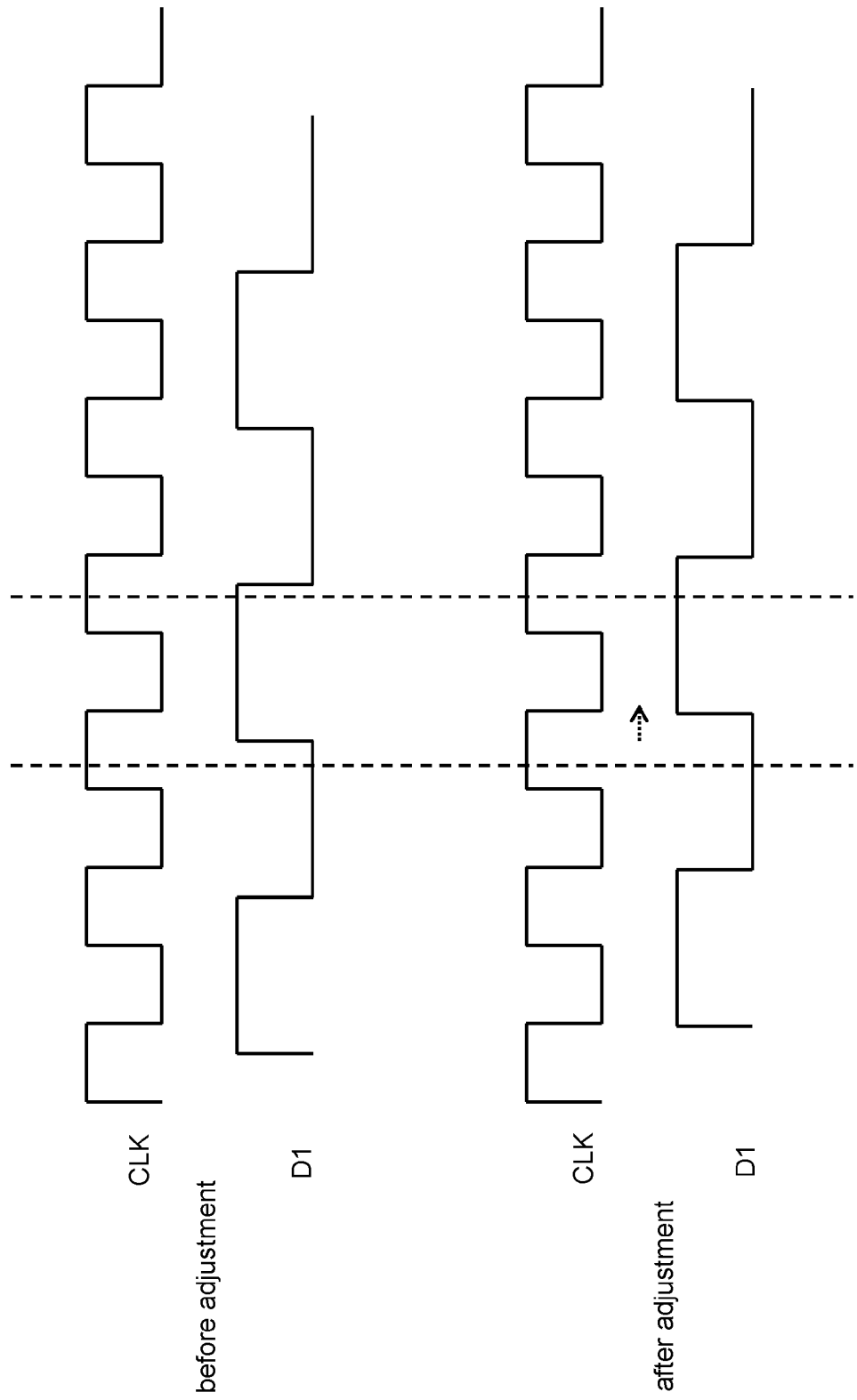
FIG. 5 is a schematic diagram of a relationship between edges of a clock signal and a first signal adjusted by the first edge adjusting circuit in FIG. 1 according to an embodiment.

FIG. 5 shows a schematic diagram of a relationship between edges of the clock signal CLK and the first signal D1 adjusted by the first edge adjusting circuit 126. As shown in FIG. 5, within a range (as indicated by dotted lines in FIG. 5), edges of the clock signal CLK and the first signal D1 before adjustment are unaligned, whereas the edges of the clock signal CLK and the first signal D1 after adjustment are close or aligned. At this point, the foregoing predetermined timing relationship means that the edges of the two signals are close or aligned. However, the above example is not to be construed as a limitation to the present invention, given that the edges of the two signals satisfy a predetermined relationship, as seen appropriate by a practitioner based on actual requirements. In the embodiment, considering that the clock signal CLK is used to further sample other data signals, the first edge adjusting circuit 126 is prioritized to adjust the transition edge of the first signal. However, a practitioner may prioritize the first edge adjusting circuit 126 to adjust other signals based on actual requirements, and can understand how to correspondingly modify the embodiments of the present invention based on the disclosure of the application. Further, when a rising edge of the clock signal CLK is used as a basis for sampling data, the first edge adjusting circuit 126 adjusts the transition edge of the first signal D1 to be close or to align with a falling edge of the clock signal CLK to satisfy the predetermined timing relationship (as show by the dotted arrow in FIG. 5). As such, the rising edge of the clock signal CLK may get close or align with the middle of an interval between two level changes of the first signal D1 to increase the tolerance of sampling offset. When a falling edge of the clock signal CLK is used as a basis for sampling data, the first edge adjusting circuit 126 adjusts the transition edge of the first signal D1 to be close to or to align with the rising edge of the clock signal CLK. However, in possible implementation, a practitioner may adjust the rules based on actual application requirements.

Again referring to FIG. 1, after the first edge adjusting circuit 126 completes the edge adjustment, the control circuit 124 may selectively count the number of appearances of a predetermined value according to the data signals, and causes the calibrator 120 to stop calibrating the relationship between the clock signal and the first signal when the number of appearances of the predetermined value satisfies a predetermined condition. For example, the predetermined condition is selectively associated with the frequency. For example, the predetermined condition is that the number of appearances of the predetermined value is between or not smaller than a predetermined range. For example, the transport stream that the input port 110 receives transmits synchronization information at a constant interval, with the synchronization information being a predetermined value. Thus, by counting the number of appearances of the synchronization information in a predetermined period, whether the edge adjustment performed on the data signals is correct may be determined.

Figure 6:
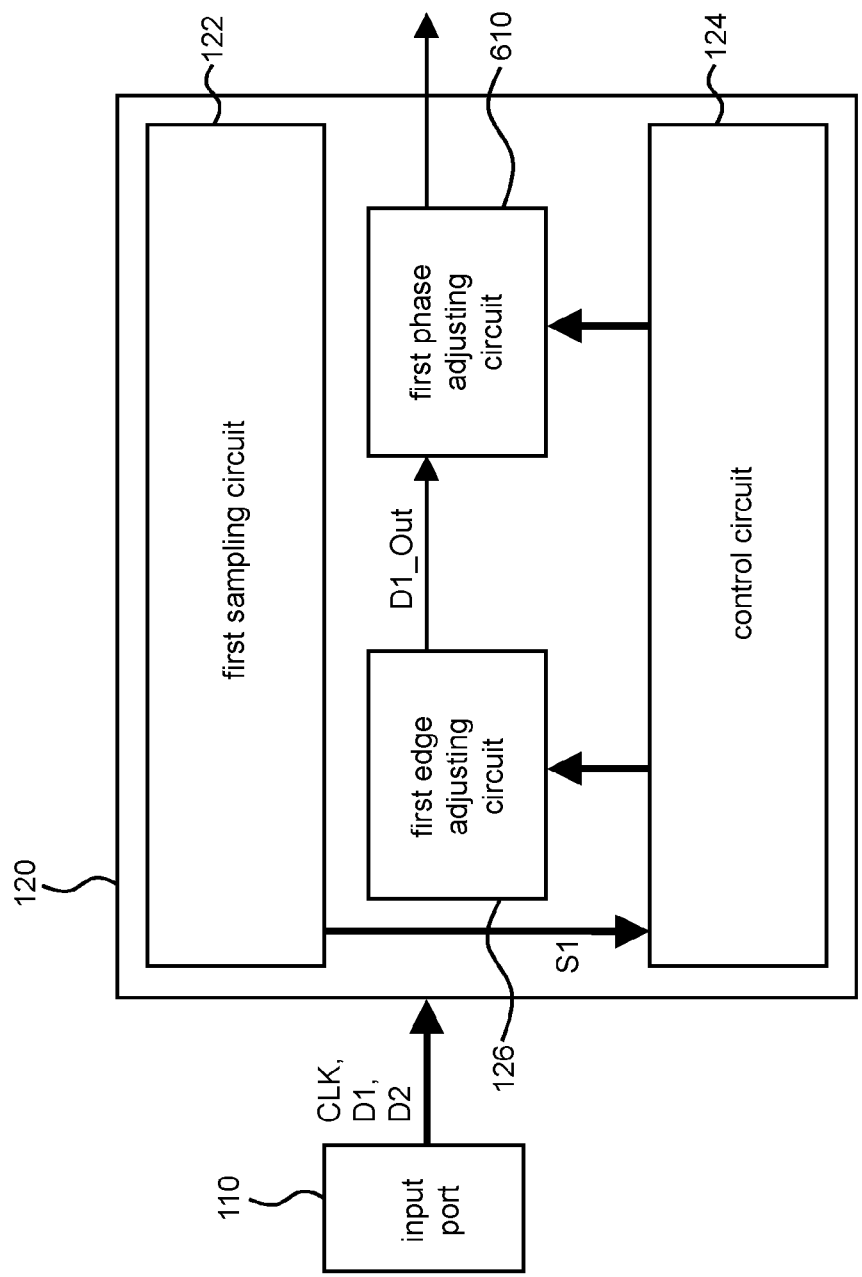
FIG. 6 is a schematic diagram of a calibrator in FIG. 1 according to another embodiment.
Figure 7:
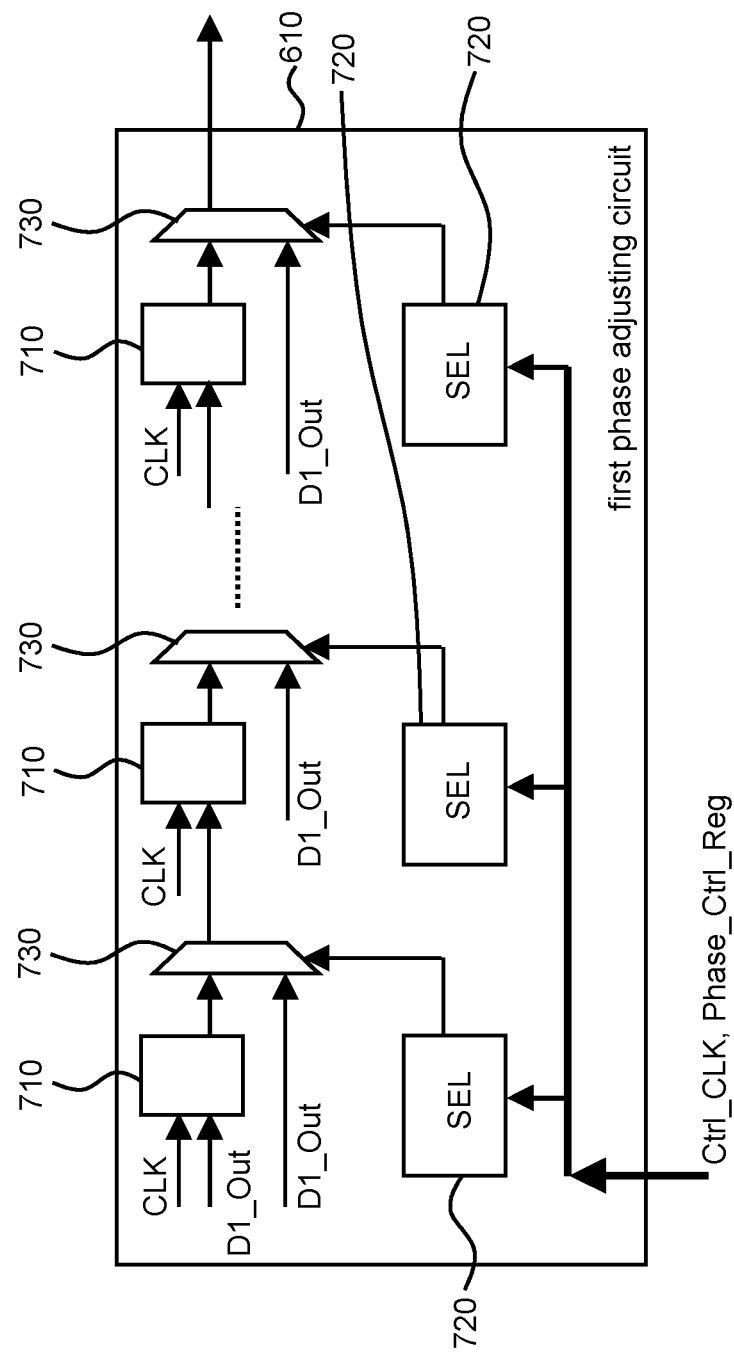
FIG. 7 is a schematic diagram of a first phase adjusting circuit in FIG. 6 according to an embodiment.

In continuation, when the count value does not reach the predetermined number (i.e., the number of appearances of the predetermined number does not satisfy the predetermined condition), it means that calibration is not yet complete, and so the control circuit 124 selectively causes the calibrator 120 to adjust the phase of the first signal D1. At this point, as shown in FIG. 6, the calibrator 120 further includes a first phase adjusting circuit 610. The first phase adjusting circuit 160 is controlled by the control circuit 124 to adjust the phase of the first signal D1 (to be referred to as D1_Out) outputted from the first edge adjusting circuit 126, and outputs the adjusted first signal D1_Out. As shown in FIG. 7, the first phase adjusting circuit 610 according to an embodiment includes X delay units 710, X selection control units 720 (denoted as SEL) and X multiplexers 730. For example, each of the delay units 710 is a latch that outputs the first signal D1_Out delayed by one or multiple units. The X selection control units 720 causes each of the X multiplexers 730 to output the first signal D1_Out that is not delayed or delayed by one or multiple units according to a trigger signal Ctrl_CLK and X phase adjusting signals Phase_Ctrl_Reg of the control circuit 120, where X is a positive integer. For example, when X is 3 and the three phase adjusting signals Phase_Ctrl_Reg are 010, the first multiplexer 730 receiving 0 outputs the first signal D1_Out that is not delayed (i.e., the first signal D1_Out does not pass any delay unit 710), the second multiplexer 730 receiving 1 outputs the first signal D1_Out delayed by one unit (i.e., the first signal D1_out passes one delay unit 710), and the third multiplexer 720 receiving 0 outputs the first signal D1_Out delayed by one unit (i.e., the first signal D1_out outputted from the second multiplexer 730) as the final outputted first signal D1_Out for actual sampling or other adjustment (e.g., phase adjustment). Similarly, after the phase adjusting circuit 610 adjusts the first signal D1_out, the control circuit 124 may further count the number of appearances of the predetermined value according to the data signals, and causes the calibrator 120 to stop calibrating the relationship between the clock signal CLK and the first signal D1 when the number of appearances of the predetermined value satisfies the predetermined condition, or causes the calibrator 120 to again adjust the phase of the first signal D1_Out outputted by the first edge adjusting circuit 126 when the number of appearances of the predetermined value does not satisfy the predetermined condition.

Referring to FIG. 1, the calibrator 120 may further include a switch 128, which is controlled by the control of the control circuit 124 to enable or disable the first sampling circuit 122. For example, the switch 128 is located between a source of the clock signal and the first sampling circuit 122. When the control circuit 124 turns on the switch 128, the first sampling circuit 122 then performs sampling. When sampling is complete for calibration or when calibration is complete, the control circuit 124 turns off the switch 128 to accordingly disable the first sampling circuit 122. At this point, the control circuit 124 and the first edge adjusting circuit 126 may continue operating to maintain the calibration effect. Further, the control circuit 124 may select one of the data signals to serve as the first signal D1 and/or select one of the remaining data signals as the second signal D1 according to a predetermined rule. Details of similar signal selection may be deduced.

Figure 8:
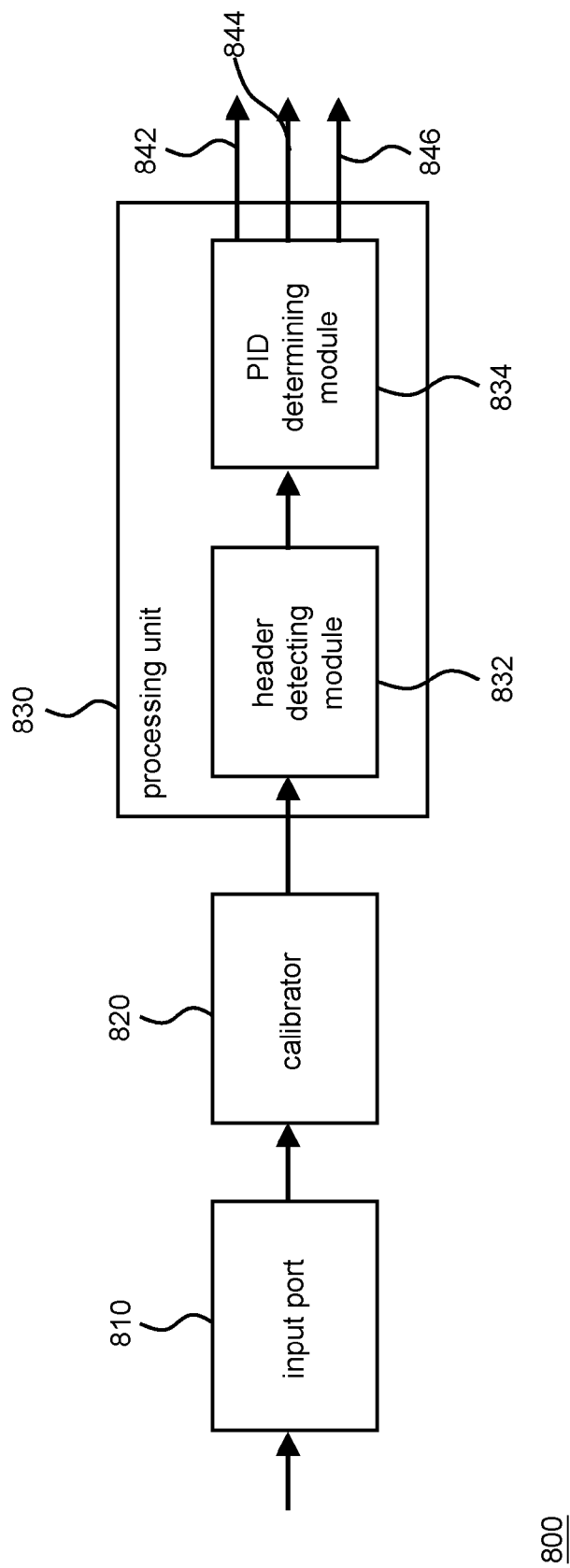
FIG. 8 is a schematic diagram of a transport stream processor including the timing calibration device in FIG. 1 according to an embodiment.

The disclosed timing calibration device may be applied to a transport stream processor. The present invention correspondingly discloses a transport stream processor capable of timing calibration. FIG. 8 shows a schematic diagram of the transport stream processor according to an embodiment of the present invention. For example, the transport stream is from a Digital Video Broadcasting-Terrestrial (DVB-T) device or other audiovisual transport streams, and includes multiple successively transmitted packets. These packets may be in types of image data packets, audio data packets and information packets (e.g., subtitles and program information). Each packet includes header, which includes a packet identifier (PID) for identifying the type of the packet. Referring to FIG. 8, the transport stream processor 800 includes an input port 810, a calibrator 820 and a processor 830. The input port 810 receives the transport stream through a plurality of signal paths. The received transport stream includes one clock signal CLK, eight data signals D1 to D8, one validity signal Valid and one synchronization signal Sync. Packet data of each packet in the transport stream is distributed in the data signals D1 to D8. The calibrator 820 includes eight sampling circuit, a control circuit, and eight edge adjusting circuits. The sampling circuits respectively sample the data signals D1 to D8 to generate eight sample results. The control circuit determines the validity of the sample results according to whether each of the samples results includes a transition edge of the corresponding data signals. The edge adjusting circuits respectively adjust the transition edges of the data signals when the sample results are valid, such that the transition edges of the adjusted data signals and the transition edge of the clock signal satisfy a predetermined timing relationship. In the calibration process, the calibrator 820 further determines whether the calibration result is correct according to a predetermined value corresponding to the synchronization signal Sync in the transport stream. For example, when the validity signal Valid is 1 and the synchronization signal Sync is 1, the control circuit determines whether the data carried in the data signals D1 to D8 is equal to a hexadecimal value 0x47 (i.e., a binary value 01000111, serving as the foregoing predetermined value). If so, the counter value is added by one, or else the counter value is kept unchanged. In a predetermined time or signal periods, if the counter value reaches a predetermined number (i.e., the number of appearances of the predetermined value satisfies the predetermined condition, e.g., an associated frequency (the number of appearances in a predetermined time) is between 1/189 and 1/193), it means that the calibration is complete, and so the control circuit causes the calibrator 820 to stop calibrating. Further, the calibrator 820 may further include eight phase adjusting circuits, which are controlled by the control circuit to adjust the phases of the data signals D1 to D8 adjusted by the edge adjusting circuits. When the number of appearances of the predetermined value does not satisfy the predetermined condition, the control circuit causes the phase adjusting circuits to adjust the phases of the data signals D1 to D8. In this embodiment, the operations, effects and implementation details of the sampling circuits, the control unit, the edge adjusting circuits and the phase adjusting circuits are identical to those in the foregoing embodiments. After the calibrator 820 completes the timing calibration of the transport stream, the calibrated transport stream is outputted to the processing unit 830. The processing unit 830 includes a header detecting module 832 and a PID determining module 834. The header detecting module 832 identifies a header of packet data in the data signals D1 to D8 of the transport stream. In practice, the header detecting module 832 may include a comparator, which compares whether the data in the data signals D1 to D8 matches a predetermined PID or a start code of a known packet header. If the comparison result indicates a match, it means the header is found. When the header detecting module 832 identifies the header of packet data, the PID determining module 834 determines the type of the packet data according to the PID in the header. When the packet data is audio data, the PID determining module 834 outputs the packet data through an audio output path 842. When the packet data is video data, the PID determining module 834 outputs the packet data through a video output path 844. When the packet data is information data, the PID determining module 834 outputs the packet data through an information output path.

Figure 9:
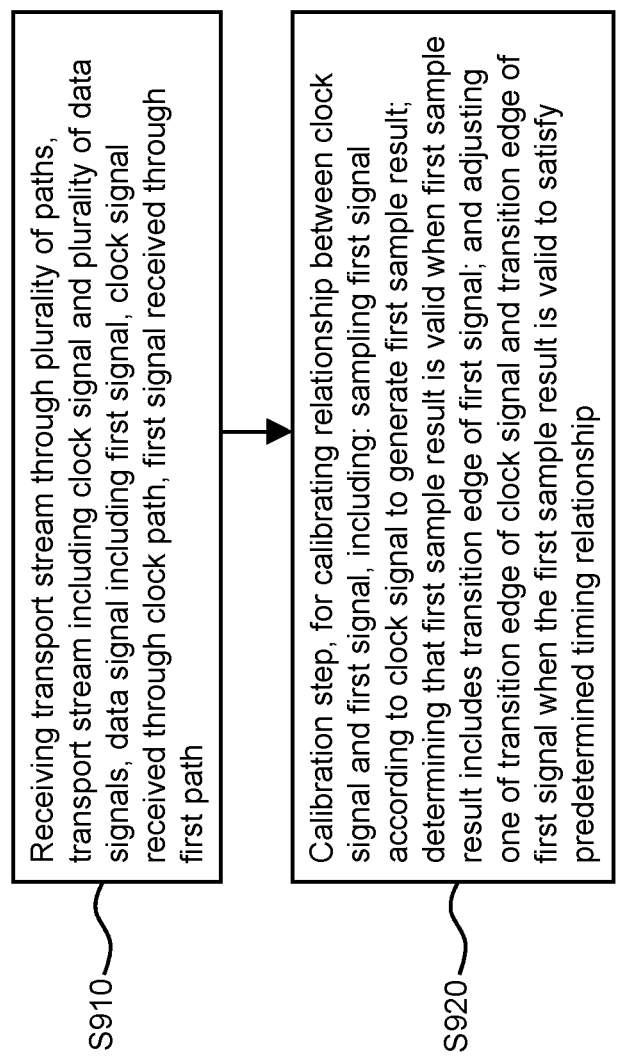
FIG. 9 is a schematic diagram of a timing calibration method according to an embodiment of the present invention.

In addition to the foregoing timing calibration device, the present invention further discloses a timing calibration method. As shown in FIG. 9, the timing calibration method includes following steps.

In step S910, a transport stream is received through a plurality of paths. The transport stream includes a clock signal and a plurality of sets of data signals. The data signals include a first signal. The clock signal is received through a clock path, and the first signal is received through a first path. This step may be performed by the input port 110 in FIG. 1 or an equivalent circuit.

In step S920, a calibration step is performed to calibrate a relationship between the clock signal and the first signal. The calibration step includes: sampling the first signal according to the clock signal to generate a first sample result; determining that the first sample result is valid when the first sample result includes a transition edge of the first signal; and adjusting a transition edge of the clock signal and the transition edge of the clock signal when the first sample result is valid to satisfy a predetermined timing relationship. This step may be performed by the calibrator 120 in FIG. 1 or an equivalent circuit.

In conclusion, the timing calibration device and method of the present invention are capable of improving the issue of asynchronous clock signal and data signal caused by different transmission paths, thereby preventing issues such as sampling errors.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A transport stream processor for timing calibration and processing a transport stream, the transport stream comprising a clock signal and a plurality of data signals, the transport stream processor comprising:
an input port, receiving the clock signal and the data signals through a plurality of paths;
a calibrator, comprising:
a plurality of sampling circuits, respectively sampling the data signals according to the clock signal to generate a plurality of sample results;
a control circuit, determining validity of the sample results according to whether each of the sample results comprises a transition edge of a corresponding data signal; and
a plurality of edge adjusting circuits, respectively adjusting transition edges of the data signals, such that the adjusted transition edges of the data signals and a transition edge of the clock signal satisfy a predetermined timing relationship; and
a processing unit, identifying a header of packet data from the adjusted data signals, and determining to output the packet data through one of an audio output path, a video output path and a data output path according to information of the header.

2. The transport stream processor according to claim 1, wherein the control circuit further counts the number of appearances of a predetermined value of the adjusted data signals and causes the calibrator to stop calibrating when the number of appearances of the predetermined value satisfies a predetermined condition.

3. The transport stream processor according to claim 2, wherein the calibrator further comprises a plurality of phase adjusting circuits that are controlled by the control circuit to adjust phases of the adjusted data signals; when the number of appearances of the predetermined value does not satisfy the predetermined condition, the control circuit causes the phase adjusting circuits to perform phase adjustment.

4. A timing calibration device, calibrating a timing relationship between a clock signal and a first signal of a transport stream, comprising:
an input port, receiving the clock signal through a clock transmission path, and receiving the first signal through a signal path; and
a calibrator, comprising:
a first sampling circuit, sampling the first signal according to the clock signal to generate a first sample result;
a control circuit, determining that the first sample result is valid when the first sample result comprises a transition edge of the first signal; and
a first edge adjusting circuit, adjusting one of a transition edge of the clock signal and the transition edge of the first signal when the first sample result is valid to satisfy a predetermined timing relationship,
wherein the calibrator further comprises a switch that is controlled by the controller to enable or disable the first sampling circuit.

5. The timing calibration device according to claim 4, wherein the first edge adjusting circuit adjusts the transition edge of the first signal when the first sample result is valid to cause the transition edge of the first signal to be close to or to align with the transition edge of the clock signal to satisfy the predetermined timing relationship.

6. The timing calibration device according to claim 4, wherein the transport stream comprises a plurality of data signals, the first signal is one of the data signals, the control circuit counts the number of appearances of a predetermined value according to the data signals after the first edge adjusting circuit completes edge adjustment and causes the calibrator to stop calibrating when the number of appearances of the predetermined value satisfies a predetermined condition.

7. The timing calibration device according to claim 4, wherein the transport stream comprises a plurality of data signals, the first signal is one of the data signals, the control circuit counts the number of appearances of a predetermined value according to the data signals after the first edge adjusting circuit completes edge adjustment and causes the calibrator to adjust a phase of the first signal when the number of appearances of the predetermined value does not satisfy a predetermined condition.

8. The timing calibration device according to claim 7, wherein the calibrator further comprises a first phase adjusting circuit that is controlled by the controller to adjust the phase of the first signal.

9. The timing calibration device according to claim 8, wherein the control circuit further counts the number of appearances of the predetermined value after the first phase adjusting circuit adjusts the phase of the first signal, and causes the calibrator to stop calibrating when the number of appearances of the predetermined value satisfies the predetermined condition.

10. The timing calibration device according to claim 4, wherein the transport stream comprises a plurality of data signals, the first signal is one of the data signals, the data signals further comprise a second signal, and the calibrator further comprises:
a second sampling circuit, sampling the second signal according to the clock signal to generate a second sample result; and
a second edge adjusting circuit, adjusting one of the transition edge of the clock signal and a transition edge of the second signal when the control circuit determines that the second sample result is valid to satisfy the predetermined timing relationship.

11. The timing calibration device according to claim 10, wherein the control circuit selects one of the data signals as the first signal and selects one of the remaining data signals as the second signal according to a predetermined rule.

12. A timing calibration method, for calibrating a timing relationship between a clock signal and a first signal of a transport stream, comprising:
receiving the clock signal through a clock transmission path, and receiving the first signal through a signal path;
sampling the first signal according to the clock signal to generate a first sample result;
determining that the first sample result is valid when the first sample result comprises a transition edge of the first signal; and
adjusting one of a transition edge of the clock signal and the transition edge of the first signal when the first sample result is valid to satisfy a predetermined timing relationship,
wherein the transport stream comprises a plurality of data signals, the first signal is one of the data signals, the timing calibration method further comprising:
after adjusting one of the transition edge of the clock signal and the transition edge of the first signal to satisfy the predetermined timing relationship, counting the number of appearances of a predetermined value according to the data signals, and stopping calibrating when the number of appearances of the predetermined value satisfies a predetermined condition.

13. The timing calibration method according to claim 12, wherein the step of adjusting one of the transition edge of the clock signal and the transition edge of the first signal when the first sample result is valid to satisfy the predetermined timing relationship is adjusting the transition edge of the first signal, such that the transition edge of the first signal aligns with or is close to the transition edge of the clock signal.

14. The timing calibration method according to claim 12, wherein a phase of the first signal is adjusted when the number of appearances of the predetermined value does not satisfy the predetermined condition.

15. The timing calibration method according to claim 12, wherein the transport stream comprises a plurality of data signals, the first signal is one of the data signals, the data signals further comprise a second signal, the timing calibration method further comprising:
sampling the second signal according to the clock signal to generate a second sample result;
determining that the second sample result is valid when the second sample result comprises a transition edge of the second signal; and
adjusting one of the transition edge of the clock signal and the transition edge of the second signal when the second sample result is valid to satisfy the predetermined timing relationship.

* * * * *